United States Patent [19]
Abbruscato

[11] Patent Number: 5,841,846
[45] Date of Patent: Nov. 24, 1998

[54] DIGITAL TELEPHONIC SYSTEM FOR STETHOSCOPE SIGNAL PROCESSING

[75] Inventor: C. Richard Abbruscato, Burnsville, Minn.

[73] Assignee: American TeleCare, Inc., Eden Prairie, Minn.

[21] Appl. No.: 714,671

[22] Filed: Sep. 16, 1996

[51] Int. Cl.[6] .............................. H04M 11/00; A61B 7/04
[52] U.S. Cl. ................................ 379/106.02; 379/110.01; 381/67
[58] Field of Search .......................... 379/106.01, 106.02, 379/110.01, 90.01, 93.05, 93.06, 93.08, 93.28; 381/67

[56] References Cited

U.S. PATENT DOCUMENTS

| | | |
|---|---|---|
| 3,810,102 | 5/1974 | Parks, III et al. . |
| 3,863,625 | 2/1975 | Viglione et al. . |
| 3,872,252 | 3/1975 | Malchman et al. . |
| 4,055,729 | 10/1977 | Vandling . |
| 4,220,160 | 9/1980 | Kimball et al. . |
| 4,281,664 | 8/1981 | Duggan . |
| 4,291,198 | 9/1981 | Anderson et al. . |
| 4,325,383 | 4/1982 | Lacks . |
| 4,428,381 | 1/1984 | Hepp . |
| 4,754,762 | 7/1988 | Stuchl . |
| 4,883,064 | 11/1989 | Olson et al. . |
| 4,889,134 | 12/1989 | Greenwold et al. . |
| 4,898,179 | 2/1990 | Sirota ........................................ 381/67 |
| 4,920,558 | 4/1990 | Hird et al. . |
| 4,977,899 | 12/1990 | Digby et al. . |
| 5,226,086 | 7/1993 | Platt . |
| 5,226,431 | 7/1993 | Bible et al. . |
| 5,367,555 | 11/1994 | Isoyama . |
| 5,418,686 | 5/1995 | Dieken et al. . |
| 5,467,775 | 11/1995 | Callahan et al. ........................... 381/67 |

*Primary Examiner*—Wing F. Chan
*Attorney, Agent, or Firm*—Patterson & Keough, P.A.

[57] ABSTRACT

The present invention relates to digital telephonic system for stethoscope signal processing. Stethoscope sounds are converted to electrical signals and conveyed in digital format to an RS232 data port of a data transmission product. In the alternate, a modem can be used to convey the signal via a home telephone line. At the receiving end, the reverse process takes place to convert the data back to audible sound. The fidelity and accuracy of the stethoscope sounds is maintained at the receiving end using asynchronous data communications and error protection techniques.

19 Claims, 3 Drawing Sheets

DIGITAL TELEPHONIC SYSTEM FOR STETHOSCOPE SIGNAL PROCESSING

FIELD OF THE INVENTION

The present invention relates generally to stethoscope devices. More particularly, the present invention relates to a digital method and device for the transmission of stethoscope sounds from a patient at a location and the reception of high quality auscultation sounds, in real-time, by a doctor at another location utilizing a low bit rate and a regular telephone line or an equivalent interface.

BACKGROUND OF THE INVENTION

A stethoscope examination is one of the most essential parts of a routine physical examination. Generally, stethoscope examinations are conducted by a doctor using a bell-and-diaphragm chest piece to listen to the sounds generated by the patient's cardiovascular and respiratory systems. The bell isolates sounds in a lower frequency range, while the diaphragm passes higher frequency stethoscope sounds.

One of the basic requirements of a stethoscope examination procedure is the need to maintain a doctor-patient interaction. Generally, the patient is required to be physically present to enable the doctor to perform the examination. Consequently, patients who need frequent stethoscope examination are faced with the burdensome prospect of frequently visiting their doctor at a hospital or clinic. These difficulties are particularly burdensome to patients who live in remote areas and who need to see a doctor on a regular basis.

Accordingly, there is a need for a system by which a doctor can perform medical examinations on a remotely-located patient. Preferably, such a system would enable the doctor to perform a medical examination on a patient remotely having the advantage of a real-time evaluation and interaction with the patient.

While many techniques for sensing and transmitting data from remote locations are known, the use of a telephone line as a medium of high quality auscultation sounds poses unique challenges. Fidelity of the signal presented to the doctor's ears is of critical importance, because the doctor's opinion depends on distinguishing subtle sound patterns. The sounds of greatest interest are relatively low frequencies, generally in the range of 30 to 500 Hz. The possibility for a medical doctor far away from a patient to hear reliable and accurate stethoscope sounds will enhance health delivery. However, the home telephone line transmits the desired range of frequencies rather poorly.

Telephone signals are inherently analog. This means that the electric signal varies with the level of the sound. However, it is now well known in the art that the quality of the transmission of sound signals between switches could be improved and accomplished at a lower price by digitizing the signals. Digitizing is a form of coding. Coding is generally defined as a process of transforming messages or signals in accordance with a definite set of rules. Any analog signal can be converted to a digital signal through sampling and quantizing.

Accordingly, a digital telephonic stethoscope system must employ existing public service telephone signals and digitize them to transmit information in the low frequency range. Further, doctor-patient interaction must be maintained on a real-time basis to enable a remote real-time evaluation and diagnosis of the patient.

SUMMARY OF THE INVENTION

The present invention provides a digital telephonic system which advantageously employs digital techniques for the transmission of the auscultation data. The techniques disclosed in the present invention enable the transmission of high quality sound over a relatively small bandwidth. Specifically, the present invention enables the use of low priced modems over normal telephone lines at a reduced bandwidth.

Existing art requires large bandwidth, generally in the range of 32–128 Kb/s, and are relatively expensive for digital telephonic stethoscope sound transmission. Large or wide band digital systems cannot be used over normal telephone lines or in other low cost and low bandwidth applications.

Generally, the present invention provides a digital-based stethoscope which sends stethoscope sounds from a patient over a data communications channel to a doctor or nurse to thereby allow a real-time transmission of auscultation sounds for diagnosis and evaluation. Primarily, two stations, a doctor's and a patient's station, are remotely connected via intermediate digital equipment such that analog signals from a chest piece at the patient's station are converted to digital signals and are sent through a modem or multiplier to another modem or multiplier at the doctor's station. The present invention utilizes a circuit to sample the analogs and quantize them into digital format. Quantizing involves comparing each of a sample amplitude against a list of discrete sample intervals. Each discrete interval is described by a code, a binary number. The process used is called pulse code modulation (PCM). Thereafter, a PCM decoder translates the binary data into analog signals which are presented to the doctor through a headset.

One of the many unique features of the present invention is the enablement of high-fidelity sound transmission over low bit rate data channels. Primarily, only a small number of quantization levels are used for the PCM and require only a small number of data bits. To compensate for the small number of bits, a companding procedure is implemented to minimize the amount of quantization noise by taking advantage of the nature of the stethoscope signal. Companding involves compression and expansion. Using the companding process, the present invention provides 12-bit PCM resolution with only 8 bits.

Further, one of the many unique optional features of the present invention includes error handling to prevent retransmission of corrupted data. Error is checked by transmitting a parity bit with the data. When an error is detected at the receiving end, the corrupted byte is discarded and it is replaced by the byte occurring just prior to it. This results in the PCM decoder receiving the same data twice.

Yet another unique feature of the present invention is the use of asynchronous transmission to provide a simple low cost framing scheme. Asynchronous transmission is not typically used in real-time applications. Asynchronous transmission is implemented in such a way as to maintain real-time data flow very simply at a low cost.

Another feature of the present invention includes an optional use of an adaptive differential PCM (ADPCM) encoder. The ADPCM encoder translates the value of each byte into a differential value which represents the decrease or increase from the previous value. Because the acoustic tends to vary gradually, the differential value will usually be a small number, thereby permitting the use of less bits to represent the signal.

Yet another feature of the present invention is the adaptability to a direct digital connection between the doctor's and the patient's stations. Data is transmitted over the direct digital connection using an RS-232 interface.

It will be appreciated that such features, methods and devices are advancements over prior art methods and apparatus. Other features and advantages of the present invention will become apparent upon examination of the following description dealing with several specific embodiments thereof.

DETAILED DESCRIPTION OF THE PREFERRED EMBODIMENT

The present invention relates to an efficient coding scheme without sacrificing high linearity to digitally transmit high quality auscultation sounds over normal telephone lines. Specifically, the present invention provides an improved coding system over existing practice in which linear encoding is used with wide bandwidth. Most of these encoders have to pass the entire range of 300–3,000 Hz. The present invention passes only about 500 Hz.

Figure 1:
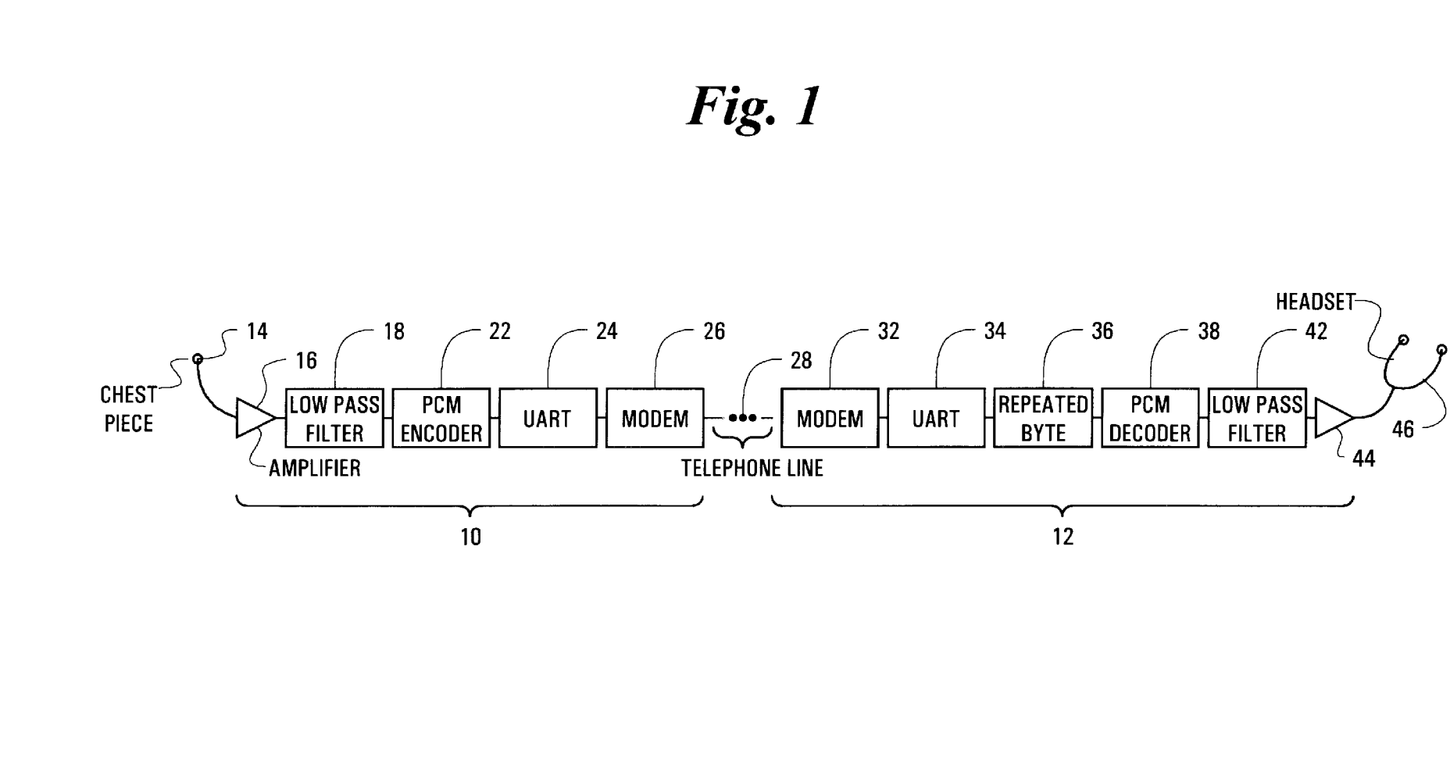
FIG. 1 is a block diagram showing the patient's and doctor's stations connected via telephone line and associated digital signal processing systems.

Referring now to FIG. 1 a patient's station 10 is connected to a doctor's station 12 as shown. Analog signal from chest piece 14 is amplified by amplifier 16 and fed to lowpass filter 18. The signal is then transferred to PCM encoder 22. The output from PCM encoder 22 is sent to the transmit side of Universal Asynchronous Receiver/Transmitter 24 and then to modem or multiplexor 26. The signal is sent over telephone line 28 to doctor's station 12. At doctor's station 12 the reverse process takes place to convert the data signal back to audible sound. Thus, the signal received by telephone line 28 is transferred into modem 32. From modem 32 it is transferred to UART 34. The output side of UART 34 is connected to repeated byte 36. Repeated byte 36 is in turn connected to PCM decoder 38. The output from PCM decoder 38 is sent to lowpass filter 42. The signal is then amplified by amplifier 44 and ultimately fed to headset 46.

Figure 2:
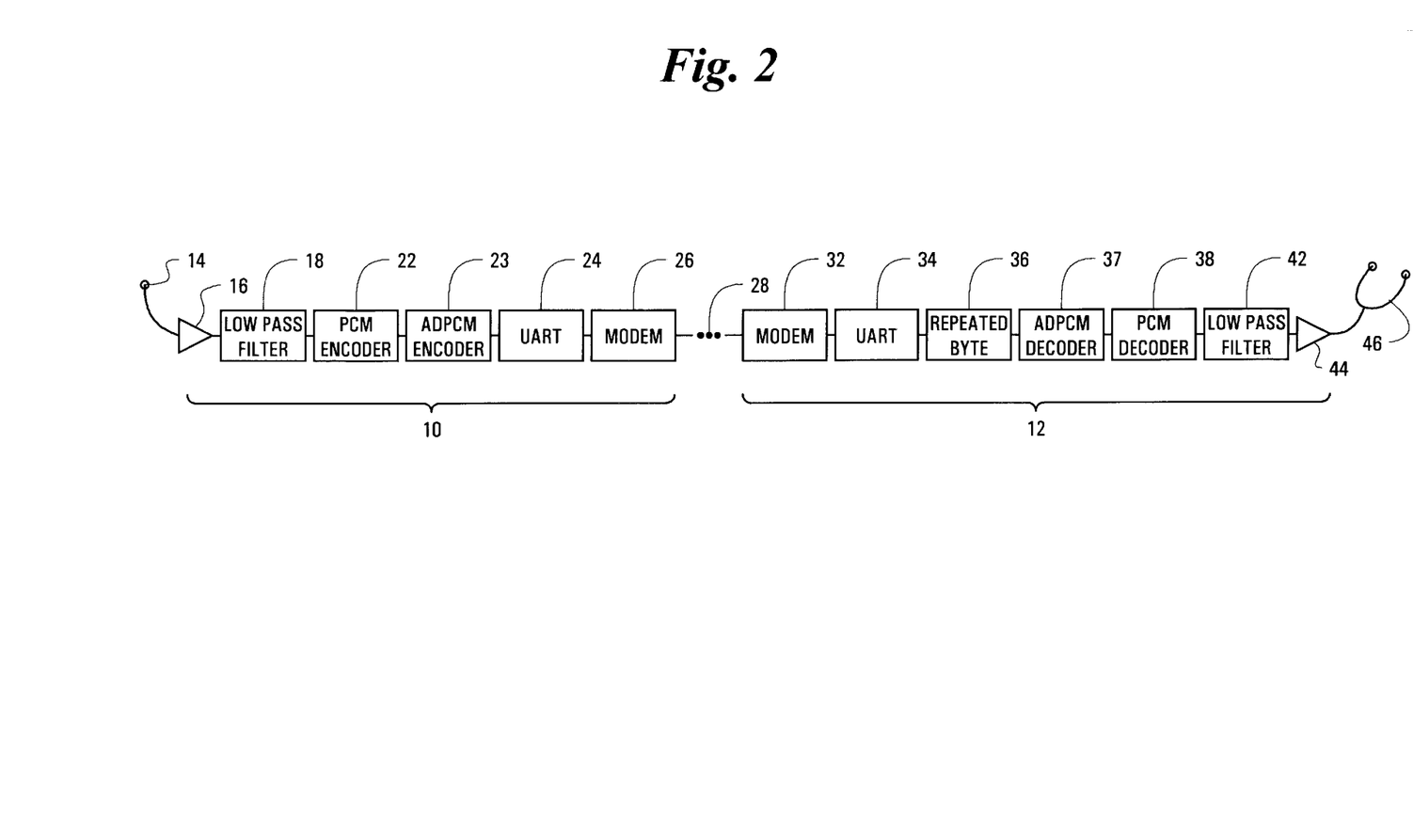
FIG. 2 is an alternate embodiment in which and ADPCM encoder is used at both the patient's and the doctor's stations.

FIG. 2 shows an alternate embodiment showing the addition of Adaptive Differential Pulse Code Modulation (ADPCM) encoder 23 at patient's station 10 and ADPCM decoder 37 at doctor's station 12.

Figure 3:
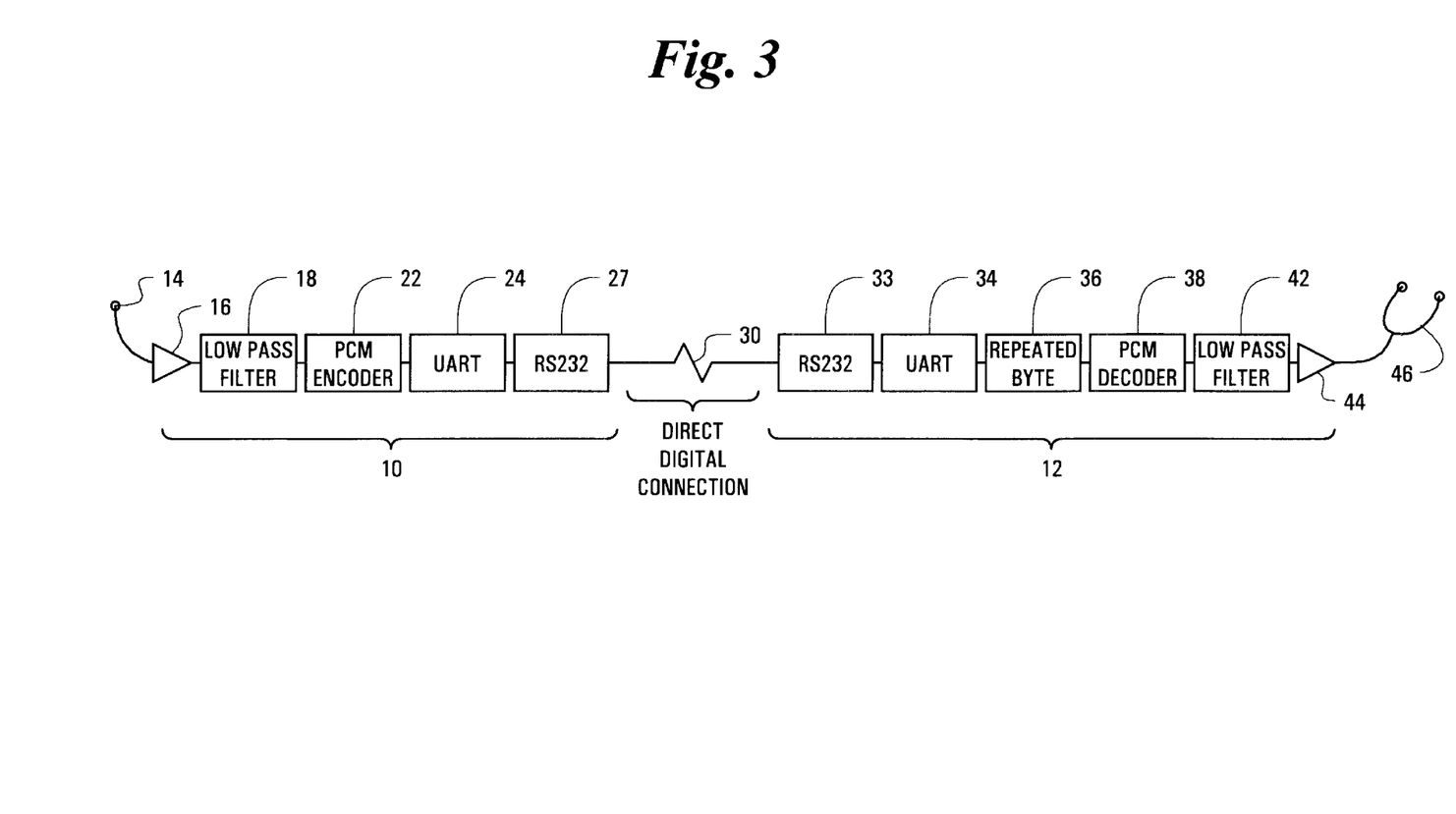
FIG. 3 is a block diagram of an alternate embodiment in which a direct digital connection is used between the patient's and the doctor's stations.

FIG. 3 shows yet another alternate embodiment in which the signal is sent via direct digital connection 30. Modem or multiplexor 26 at patient's station 10 is replaced by RS232 data port 27. Further, modem or multiplexor 32 at doctor's station 12 is replaced by RS232 data port 33.

As will be discussed hereinbelow, some of the principal features of the present invention include use of a simple low pass filter to select only the bandwidth needed for the majority of auscultation sounds. Further, telephone standard Pulse Code Modulation (PCM) coding/decoding is used to digitize the analog sounds from the stethoscope chest piece 14. PCM encoder 22 and PCM decoder 38 use a companding technique which provides the equivalent of 12 bit resolution (per sample) with only 8 bits of data. No information is lost and quantization distortion is minimized in this process.

Furthermore, use of ADPCM encoder 23 and ADPCM decoder 37 in addition to PCM encoder 22 and PCM decoder 38 cuts the bandwidth requirements in half because only 4 bits are used instead of 8 bits for each sample. Moreover, an asynchronous data communication technique is used to transfer the digitized voice samples. Typically, either synchronous or isochronous schemes are used for voice communications. Asynchronous communications is employed to keep the implementation simple and low cost. Further, byte synchronization of the digitized voice samples is easily achieved without having to add a frame synchronization pattern. Additionally, a repeated byte technique is implemented to fill in for under run of data (missing bytes) and for data over run (extra bytes). Both situations can occur in an asynchronous communication environment. Under run/over run is the key reason asynchronous communication is not used for voice applications. The present invention advantageously utilizes precise but low cost clocks at both patient's station 10 and doctor's station 12. The under run/over run occurs infrequently, and with the repeated byte technique is not detectable by the typical human ear.

Considering FIGS. 1–3 in more detail, the present invention provides digital techniques for transmission of auscultation data such that high quality sound is transported at low cost over a relatively small bandwidth. Thus, narrow bandwidth data transmission channels are efficiently and advantageously utilized.

As shown in FIGS. 1–3, the digital telephonic system of the present invention includes patient's station 10 and doctor's station 12. In the preferred embodiment, patient's station 10 includes chest piece 14. Chest piece 14 includes a stethoscope sensor with an embedded microphone attached to an electronic module. The analog signal from chest piece 14 is amplified by amplifier 16 and then filtered by low pass filter 18. The resulting signal is fed to PCM encoder 22. The analog stethoscope signals are transformed into a stream of binary data by PCM encoder 22. Subsequently, UART 22 and modem or multiplexor 26 send the binary data over telephone line 28 to modem 32 and UART 34. The signal is sent through repeated byte 36. As will be discussed hereinbelow, repeated byte 36 includes error handling circuit. Error control is optional and is implemented using a parity bit per each 8-bit PCM sample. After sending the data through repeated byte 36, PCM decoder 38 translates the binary data into analog signals which are presented to the doctor via headset 46.

Good quality transmission over low bit rate data channels is achieved by employing a number of techniques. First, only a small number of quantization levels (e.g., 256) are used for PCM decoder 38 thereby requiring a small number of data bits for example 8 bits. To compensate for the small number of bits, a companding procedure is used to minimize the amount of quantization noise by using smaller steps for low amplitude signals and larger steps for high amplitude signals. With the PCM companding, it is possible to effectively provide 12-bit coding resolution with only 8 bits. Further, optional error handling is implemented so that no bandwidth is used for retransmitting corrupted data. In one embodiment error checking is done by transmitting a parity bit with the data. When an error is detected at the receiving end, the corrupted byte is discarded, and no attempt is made to retransmit the corrupted byte. Instead, the corrupted byte is replaced with the byte occurring just prior to the corrupted byte. The result is that the same byte is used twice which is a reasonable error-correcting procedure. Further, digital data is transmitted asynchronously rather than synchronously. This keeps the implementation simple and cost effective.

A second embodiment, shown in FIG. 2 uses an adaptive differential PCM (ADPCM) encoder. This enables the translation of the value of each byte into a differential value which represents the increase or decrease from the previous value. Because the acoustic signal tends to vary slowly, the differential value will usually be a small number, thereby permitting the use of less bits to represent the signal.

A third embodiment shown in FIG. 3 is similar to that of FIG. 1, except that the telephone line is replaced with a direct digital connection. Data is transmitted over this direct connection using RS-232 27 and 33 interface.

Under normal operation where a modem is used as the interface, patient station 10 communicates with doctor's station 12 in the following manner. Either the patient or the doctor initiates contact by calling the remote station in the manner outlined in commonly-owned co-pending patent application entitled *Single-Line Telephonic System For Multi-Signal Processing*, filed on Jul. 11, 1996 and assigned Ser. No. 08/679,649, the specification and drawings of which are incorporated herein by reference. In an alternate arrangement where a multiplexor is used as an interface, a high-end video conferrencing equipment currently in use in hospitals includes digital channels which could be modified to incorporate audio and video in the same line. Such arrangements and configurations will enable patient-doctor communications. Once the communication is established, the patient may apply chest piece 14 to his/her chest to enable the doctor to monitor and provide diagnosis based on the auscultation sounds transmitted from patient station 10 to the doctor's station 12 via telephone line 28 or digital connection 30. The doctor listens through headset 46. More significantly, the present invention utilizes a digital-based stethoscope to send stethoscope sounds from the patient over a data communication channel to a doctor. The lowest known digital stethoscopes are 32 Kb of bandwidth. Thus communications implementing current stethoscopes in the normal home phone is almost impossible to be used for the purposes outlined in the present invention.

Accordingly, the digital telephonic stethoscope system of the present invention is intended to be used as a stand-alone piece of equipment or may be integrated with other Telemedicine Systems (TS). Typically, the digital telephonic system of the present invention will be a part of a telemedicine system where a multi-channel data communication link has been established. The digital telephonic system is generally connected to one of modems 26 and 32 or RS232 27 and 33 wherein the RS232 unit as described in this application is indicative of a multiplexor with an RS232 interface which is equivalent to a Data Communication Equipment (DCE).

The patient's station 10 and the doctor's station 12 are basically "ON" all the time. LEDs labeled STETH at both stations show that the unit is powered. Under normal operation, station 10 will send out a data stream of digitally encoded auscultation sounds. This signal is received by station 12 whenever the digital telephonic system data channel is up. The signal transmission and reception units of stations 10 and 12 automatically synchronize.

The digitization process includes filtering the analog signal to below 500 Hz, for example 450 Hz and encoding and decoding using PCM 22 and 38 and optional ADPCM 22 and 37 with a low sampling rate of for example 1,250 samples per second.

In the preferred embodiments disclosed hereinabove, asynchronous data communications protocol is used with preferably one start bit, one parity bit and one and half stop bits. The asynchronous transmission with UART 24 and 34 preferably uses a parity bit (optional) to protect against single bit errors. When an error is detected, the byte is discarded and the previous byte is repeated. Similarly, the repeated byte technique is also used to fill in for under-run of data and to discard extra bytes due to data over-run. Local oscillator (not shown) at both stations 10 and 12 preferably include ±100 ppm accuracy.

While the preferred embodiments of the invention have been shown and described, it will be obvious to those skilled in the art that changes, variations and modifications may be made therein without departing from the invention in its broader aspects and, therefore, the aim in the appended claims is to cover such changes and modifications as fall within the scope and spirit of the invention.

What is claimed is:

1. A method for converting, encoding and decoding analog and digital signals, while maintaining the quality and fidelity of auscultation sounds originating from a stethoscope, to enable a patient at a patient station to transmit the sounds to a doctor at a remote doctor station comprising the steps of:

amplifying analog signals from a chest piece at said patient station;

filtering said signals to get resultant signals;

feeding said resultant signals to a PCM encoder to transform said analog signals into a stream of binary data;

transferring said stream of binary data to a UART and to an ADPCM encoder and subsequently to a first modem;

sending said binary data from said first modem to a telephone line;

receiving said binary data from said telephone line via a second modem at said doctor station;

transferring said binary data from said second modem to a UART and to a repeated byte error handling circuit;

transferring said binary data from said repeated byte error handling circuit to an ADPCM decoder;

decoding said binary signal to extract said analog signal via a PCM decoder;

filtering said signal; and amplifying said signal to be received by a headset at said doctor station.

2. A method for converting, encoding and decoding analog and digital signals, while maintaining the quality and fidelity of auscultation sounds originating from a stethoscope, to enable a patient at a patient station to transmit the sounds to a doctor at a remote doctor station comprising the steps of:

amplifying analog signals from a chest piece at said patient station;

filtering said signals to get resultant signals;

feeding said resultant signals to a PCM encoder to transform said analog signals into a stream of binary data;

transferring said stream of binary data to a UART and subsequently to a first RS232;

sending said binary data from said first RS232 to a digital interface means;

receiving said binary data from said first RS232 via a second RS232 at said doctor station;

transferring said binary data from said second RS232 to a UART and consequently to a repeated byte error handling circuit;

decoding said binary signal to extract said analog signal via a PCM decoder;

filtering said signal; and amplifying said signal to be received by a headset at said doctor station.

3. The method according to claim 2 wherein said repeated byte further includes error checking step to insure that no bandwidth is used for retransmitting corrupted data.

4. The method according to claim 3 wherein said error checking step further includes transmitting a parity bit with said binary data.

5. The method according to claim 2 wherein an error correction procedure is implemented comprising the steps of:

transmitting a parity bit with said binary signal;

detecting an error at the receiving end to identify corrupted byte;

discarding said corrupted byte when detected; and replacing said corrupted byte with a byte occurring just prior to said corrupted byte.

6. The method according to claim 5 wherein said PCM decoder receives said byte occurring just prior to said corrupted byte twice as part of said error correction procedure.

7. A digital telephonic system for stethoscope signal processing wherein a patient and a doctor at a remote location are able to exchange actual stethoscopic auscultation sounds, via a plurality of analog and digital encoding and decoding means including direct digital interface means, the digital telephonic system comprising:

a patient station including:
 a chest piece with a stethoscope device;
 an amplifier
 a low pass filter in direct communication with the chest piece;
 a PCM encoder and a UART in communication with each other and further in communication with said low pass filter; and
 a first modem connected to an output port of said UART;
a doctor station comprising:
 means for receiving said stethoscope sounds;
 a low pass filter connected to said means for receiving;
 a PCM decoder in communication with said low pass filter on an output side and with a repeated byte device on an input side;
 a UART connected to said repeated byte device; and
 a second modem connected to said UART; and
 said fist modem at said patient station being connected to said second modem at said doctor station via a telephone line.

8. The digital telephonic system of claim 1 wherein said repeated byte circuit means includes an error handling system.

9. The digital telephonic system of claim 7 wherein said repeated byte circuit means includes an error handling system.

10. The digital telephonic system of claim 7 wherein said direct digital interface means includes input and output ports having connections to RS232 units on both said input and output ports.

11. The digital system of claim 7 wherein analog and digital encoding and decoding means include:

said chest piece connected to a lowpass filter and to a PCM encoder wherein said PCM encoder includes connections to a UART on an output side and further said UART includes connections to a first RS232 unit; and said means for receiving being connected to a low pass filter and to a PCM decoder and further including connections to a repeated byte circuit means and a UART including connections to a second RS232 unit;

said first RS232 unit and said second RS232 unit including operable connections via said direct digital interface means to transmit said signal from the patient station to the doctor station.

12. The digital telephonic system of claim 7 wherein said plurality of analog and digital encoding and decoding means include:

said chest piece connected to a lowpass filter and to a PCM encoder and an ADPCM encoder wherein said PCM and said ADPCM encoder include connections to a UART on an output side and further said UART includes connections to a first modem; and said means for receiving being connected to a low pass filter and to a PCM decoder, an ADPCM decoder and further includes connections to a repeated byte circuit means and a UART wherein said UART includes connections to a second modem;

said first modem and said second modem having operable connections via the telephone line to transmit said signal from the patient station to the doctor station.

13. A method for converting, encoding and decoding analog and digital signals, while maintaining the quality and fidelity of auscultation sounds originating from a stethoscope, to enable a patient at a patient station to transmit the sounds to a doctor at a remote doctor station comprising the steps of:

amplifying analog signals from a chest piece at said patient station;

filtering said signals to get resultant signals;

feeding said resultant signals to a PCM encoder to transform said analog signals into a stream of binary data;

transferring said stream of binary data to a UART and subsequently to a first modem;

sending said binary data from said first modem to a telephone line;

receiving said binary data from said telephone via a second modem at said doctor station;

transferring said binary data from said second modem to a UART and consequently to a repeated byte error handling circuit;

decoding said binary signal to extract said analog signal via a PCM decoder;

filtering said signal; and amplifying said signal to be received by a headset at said doctor station.

14. The method according to claim 13 wherein said stream of binary data is directed through an ADPCM encoder subsequent to passing through said PCM.

15. The method according to claim 13 wherein said step of decoding includes a step of error checking by transmitting a parity bit with said binary data.

16. The method according to claim 13 wherein said digital signals are transmitted asynchronously.

17. A low bit rate digital device for the transmission of stethoscope sounds from a patient at a location to a doctor at another location wherein an efficient coding scheme is used without sacrificing high linearity, the device comprising:

a patient station including:
 a chest piece including a stethoscope sensor;

an amplifier;

a lowpass filter in direct communication with said chest piece;

a PCM encoder and a UART in communication with each other and further in communication with said low pass filter; and a first modem connected to an output port of said UART;

a doctor station comprising:

means for receiving said stethoscope sounds;

a low pass filter connected to said means for receiving;

a PCM decoder in communication with said low pass filter on an output side and with a repeated byte device on an input side;

a UART connected to said repeated byte device; and a second modem connected to said UART; and said fist modem at said patient station being connected to said second modem at said doctor station via a telephone line.

18. The device according to claim 17 wherein an ADPCM encoder provides connection between said PCM encoder and said UART at said patient station and an ADPCM decoder provides connection between said PCM decoder and said repeated byte device at said doctor station.

19. The device according to claim 17 wherein said first modem at said patient station is replaced by an RS232 and said second modem at said doctor station is replaced by an RS232 and further that said telephone line is replaced by a digital interface.

* * * * *

UNITED STATES PATENT AND TRADEMARK OFFICE
CERTIFICATE OF CORRECTION

PATENT NO. : 5,841,846
DATED : November 24, 1998
INVENTOR(S) : C. Richard Abbruscato It is certified that error appears in the above-identified patent and that said Letters Patent is hereby corrected as shown below:

Column 3, line 15, please delete the word "and" and replace with the word "an".

Column 3, line 32, please add a "," following "FIG. 1".

Column 4, line 8, please change "communications" to "communication".

Column 5, line 11, please change "RS-232" to 'RS 232".

Column 5, line 17, please delete the quotation mark before the word "Single-Line".

Column 5, line 22, please change the word "conferrencing" to "conferencing".

Column 5, line 67, please add the word "a" before the word "half".

UNITED STATES PATENT AND TRADEMARK OFFICE
CERTIFICATE OF CORRECTION

PATENT NO. : 5,841,846
DATED : November 24, 1998
INVENTOR(S) : C. Richard Abbruscato It is certified that error appears in the above-indentified patent and that said Letters Patent is hereby corrected as shown below:

Column 6, line 5, please change the word "under-run" to "under run".

Column 6, line 6, please change the word "over-run" to "over run".

Column 7, line 32, please add a ";" following the word "amplifier".

Column 7, line 48, please change the word "fist" to the word "first".

Column 7, line 51, please change "claim 1" to "claim 7".

Column 7, line 67, please delete the word "and".

Column 8, line 4, please add the word "and" following "unit;".

UNITED STATES PATENT AND TRADEMARK OFFICE
CERTIFICATE OF CORRECTION

PATENT NO. : 5,841,846
DATED : November 24, 1998
INVENTOR(S) : C. Richard Abbruscato It is certified that error appears in the above-identified patent and that said Letters Patent is hereby corrected as shown below:

Column 8, line 16, please delete the word "and" at the end of the sentence.

Column 8, line 21, please add the word "and" following "modem;".

Column 9, line 15, please delete the word "and".

Signed and Sealed this

Eleventh Day of May, 1999

*Attest:*

Q. TODD DICKINSON

*Attesting Officer*     *Acting Commissioner of Patents and Trademarks*